J. B. FERGUSON.
VEHICLE.
APPLICATION FILED AUG. 25, 1916.
1,227,257.
Patented May 22, 1917.
3 SHEETS—SHEET 1.
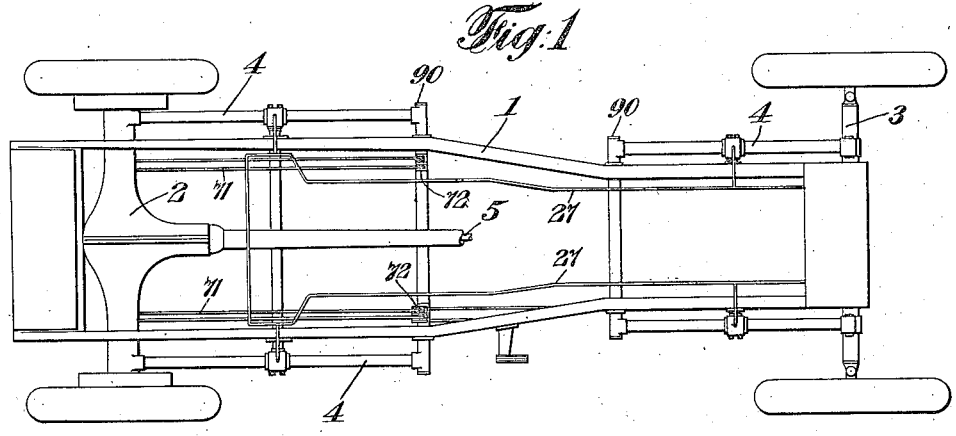
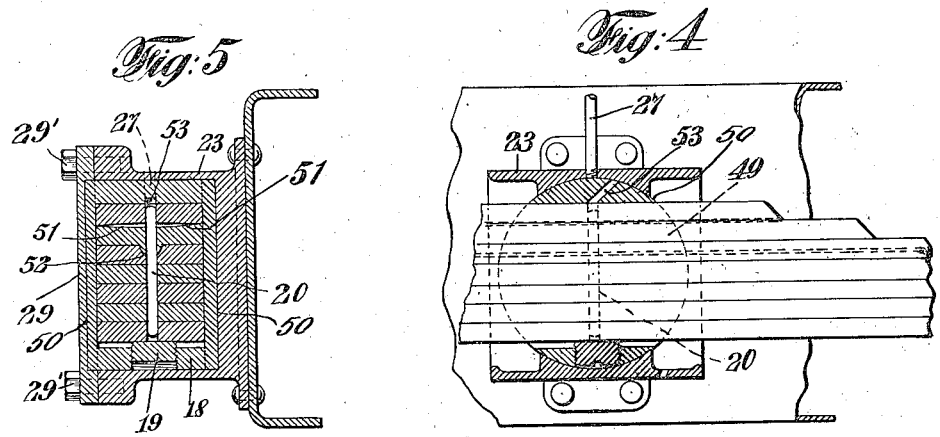
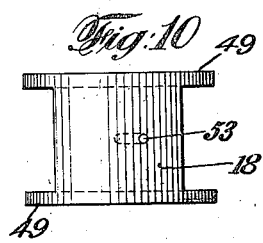
Inventor
Joseph B. Ferguson,
By his Attorneys
Kenyon & Kenyon

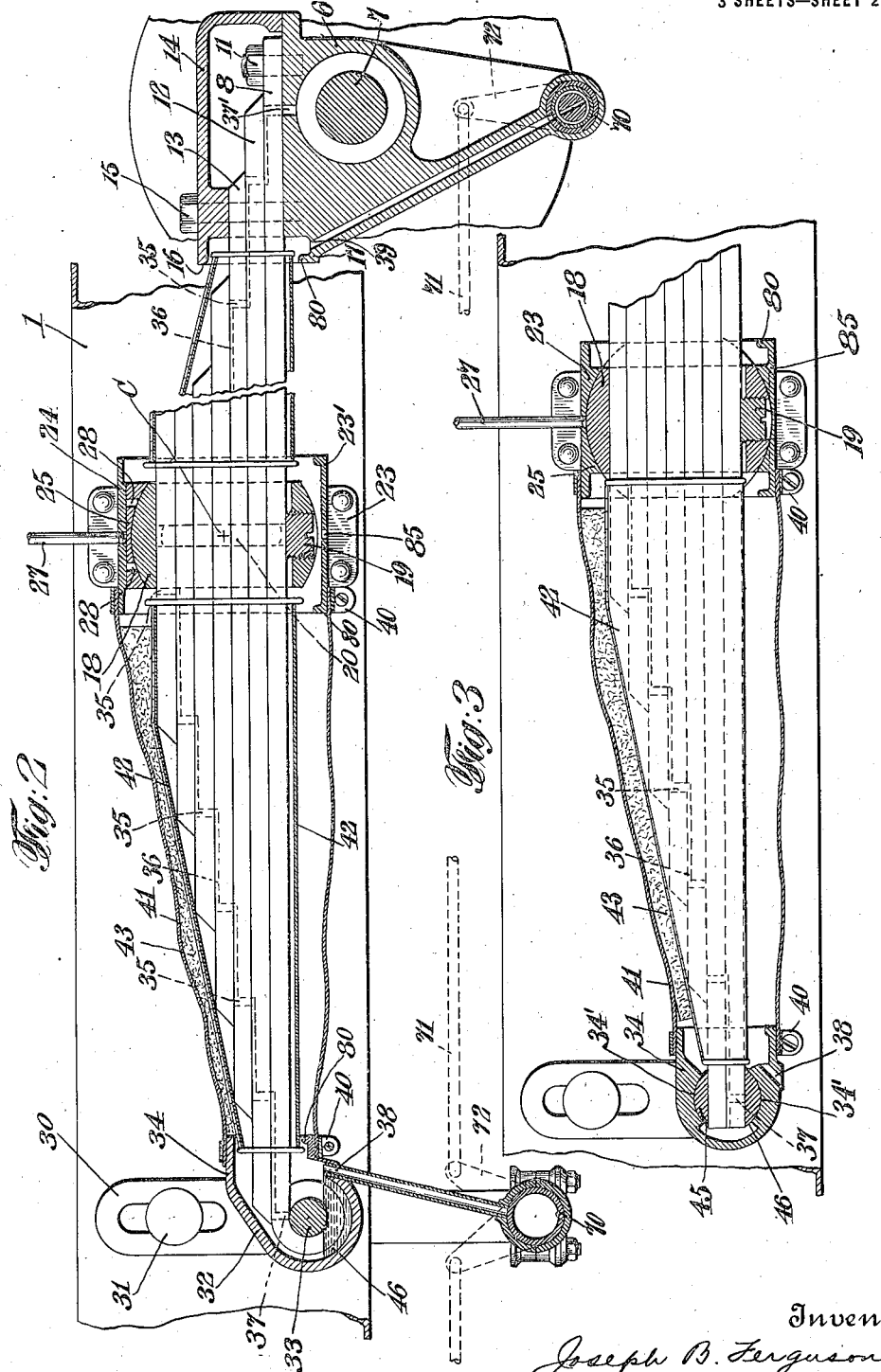

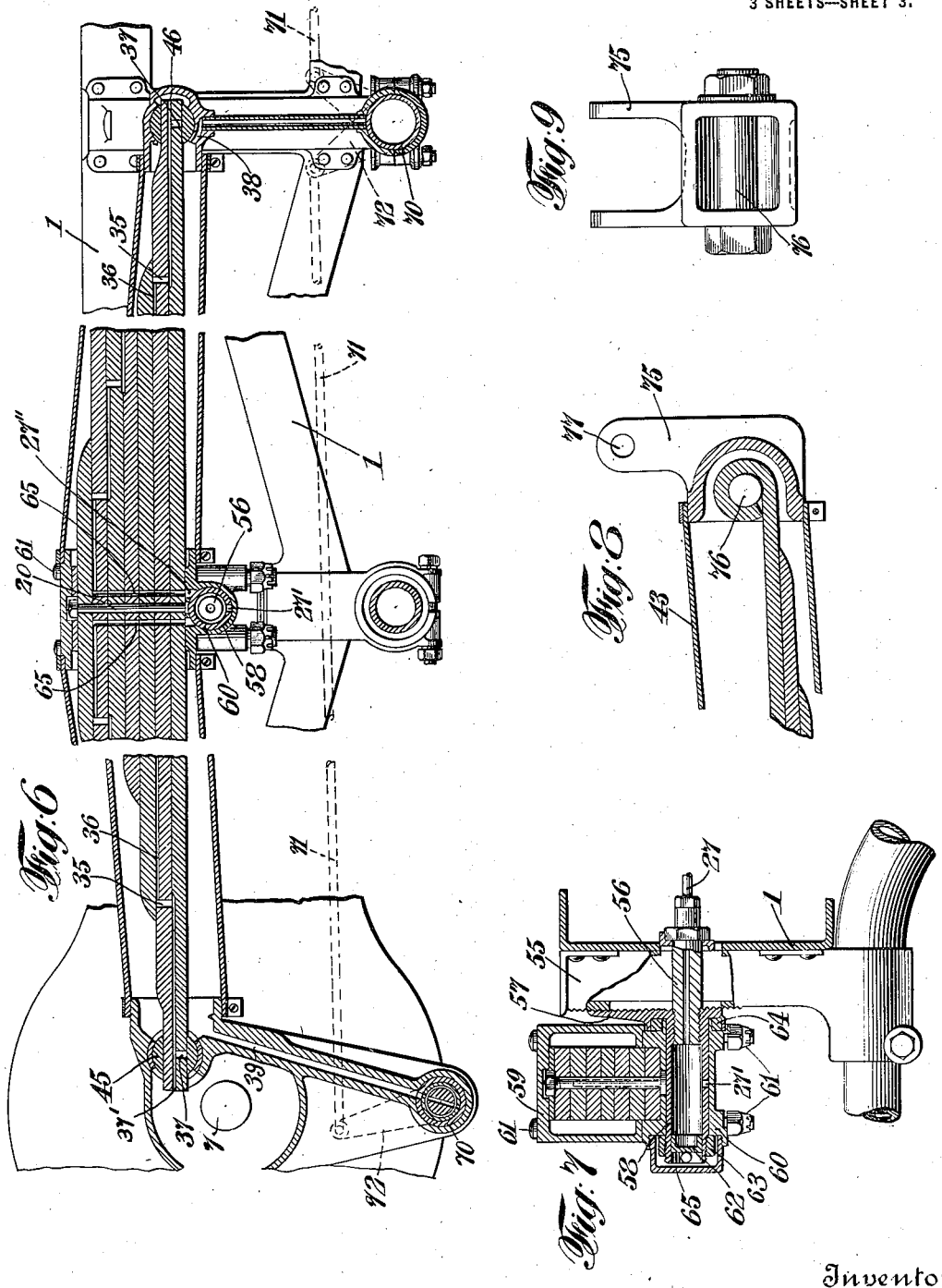

UNITED STATES PATENT OFFICE.

JOSEPH B. FERGUSON, OF NEW YORK, N. Y.

VEHICLE.

1,227,257.  Specification of Letters Patent.  Patented May 22, 1917.

Application filed August 25, 1916. Serial No. 116,869.

*To all whom it may concern:*

Be it known that I, JOSEPH B. FERGUSON, a subject of the King of Great Britain, and a resident of New York, county of New York, State of New York, have invented certain new and useful Improvements in Vehicles, of which the following is a specification.

My invention relates to vehicles and particularly to the construction and lubrication thereof. An object of my invention is to provide a vehicle, embodying a circulating system and a spring and a mounting therefor, wherein flexure of the spring is substantially or wholly unrestrained except for the inherent elasticity of the material of the spring. In the attainment of this object and as a further object I provide a construction wherein means is provided for attaching a spring to parts of the vehicle intended to be resiliently spaced apart and wherein flexure of the spring is unrestrained and to this end I provide bearing members for the spring, permitting its free movement regardless of whether or not additional forces are transmitted by said spring to said parts. In the attainment of the above objects, and as a further object, I provide a construction of a spring and its mounting, wherein provision is made to conduct lubricant to and distribute it over all rubbing surfaces and by rubbing surfaces I mean all surfaces in contact during relative motion, regardless of the nature of the motion. It is my intention that lubricant may be conducted to and distributed through each spring and its associated parts independently of other parts and also that each spring and its associated parts may be connected to or located in or form a part of a lubricant circulating system of a vehicle and be lubricated by lubricant coming from some other rubbing surfaces or pass its lubricant on to other rubbing surfaces, being thus incidentally lubricated while conducting lubricant to other parts. It is my further object to provide means for controlling the flow of lubricant to any such construction or through any such circulating system, which is dependent upon the operation of the spring and which is so constructed that it will not clog, but may, at the same time, limit the flow to a very small quantity. In order that lubricant conducted to the spring may be passed on and the spring be connected to, positioned within, or form a part of a circulating system, it is my further object to provide mountings for the spring which will permit flexible devices surrounding the spring to be attached and to provide flexible conducting members for holding the lubricant in proper relation to the spring and conducting it along its path.

Other and further objects and advantages will appear from the following description, taken in connection with the accompanying drawings, and will be pointed out in the appended claims. In the drawings, in which like reference characters indicate similar parts, Figure 1 is a partial plan view of a vehicle chassis, having springs and mountings embodying my invention. Fig. 2 is a partial longitudinal section of a preferred form of a spring embodying my invention. Fig. 3 is a partial longitudinal section of a variation of the form shown in Fig. 2. Fig. 4 is another variation. Fig. 5 is a sectional view of the device shown in Fig. 4. Fig. 6 is a partial longitudinal view of another variation. Fig. 7 is a cross-section of the structure shown in Fig. 6. Figs. 8 and 9 are details of slight variations of structure, and Fig. 10 is a detail.

For the purpose of disclosing my invention, I describe and illustrate in this specification a vehicle, including a spring embodying the features of my invention. The particular form of spring illustrated and described herein is commonly termed a cantaliver spring, but it is to be understood that my invention is readily adaptable to use in connection with springs of other types, and that I do not intend to limit my invention to the specific details herein referred to for the purpose of disclosing my invention, but intend that it shall be limited by the hereunto appended claims. For the purpose of disclosing my invention, I herein describe, in connection with the drawings, an embodiment of my invention which is adapted to use in connection with vehicles.

In Fig. 1 a vehicle is shown with the frame 1 mounted on rear axle 2 and front axle 3 by springs 4. It is intended that power shall be transmitted to the rear wheel by the shaft 5 from any source.

In the construction shown in Fig. 2, the rear axle housing 6 has rotating within it the rear axle 7. On a flattened upper portion of said housing, the lower lamination 8 of the laminated spring is firmly secured by the bolt 11. Other laminations 12 and 13, which rest upon lamination 8 are inclosed by a cap member 14 which is held down upon the flattened face upon which the lamination 8 rests, by one or more bolts 15. The lamination 13 has a free moving contact with the cap 14. The front edge 16 of the cap 14 and the extended portion 17 of the axle housing 6 form together a complete rim, the function of which will hereinafter appear. The laminations of the spring are inserted within a ring 18 and the set screw 19 is set up to clamp the spring members within this ring. A shear pin 20 passes with a free fit through openings in the springs to prevent relative longitudinal displacement. Fixedly mounted upon the frame member 1 there is a bracket or housing 23, the general arrangement of which is well shown in Fig. 5. In the form shown in Fig. 2, the upper inner surface 24 of the bracket or housing 23 is substantially flat. The upper and lower surfaces of the ring 18 are cylindrical, being struck from the center C at the middle of the vertical dimension of the ring. A bearing member 25, having a lower curved surface which coöperates with the upper curved surface of the ring and an upper substantially flat surface which coöperates with the substantially flat surface 24, is positioned between the ring and the upper portion of the bracket or housing 23. Several variations of this bearing are disclosed herein and it is not my intention that my invention shall be limited to any of them, but it is intended that this bearing may be varied within the scope of the claims hereunto appended. Through the upper wall of the bracket or housing 23 extends a pipe 27 of the system for supplying lubricant, and which leads to many parts of the vehicle and is fed preferably from a reservoir under pressure. The bearing member 25 may be of any desirable material, for example, lubricant-impregnated wood, or desirable bearing material, having lubricant-carrying interstices. Passing through the bearing member 25 are lubricant holes 28, which are arranged so that they are not in exact register with the discharge end of the pipe 27. The spring and the ring 18 are held in the bracket or housing 23 against lateral movement by a cap member 29, which is secured to the bracket by bolts 29'. The ends of the bracket are extended out to form continuous rims 23', which surround the openings in the ends of the bracket. The operation of this structure will appear hereinafter.

One arrangement for mounting the end of the spring is shown in Fig. 2, and it comprises brackets 30, which are adjustably held to the frame member 1 by clamping members 31 of any well-known type. These brackets include housings 32 in which are positioned pins 33. The housing has an extension 34, forming a complete ring around the opening therein, through which the spring extends. The lower lamination 8 of the spring is coiled around the pin 33.

It will be apparent that as the axle housing 8 moves up and down relatively to the frame, there will be a bending of the spring members, which will result in a rocking forward and backward of the vertical elements of the spring, particularly of those near the center of the spring, and there will be a change in the longitudinal dimension of the spring. The rocking will cause rotation of the ring about the center C. This will cause a sliding of the cylindrical surface of the ring within the cylindrical surface of the bearing member 25, and will likewise cause the reciprocation of the bearing member across the flat surface of the inner face of the bracket. The change in the longitudinal dimension will also cause some reciprocation. The oil will preferably be fed through the pipe 27 under pressure, and the backward and forward movement of the member 25 will cause a weeping of the oil from between the flat surface of the bracket 23 and member 25 and a flow of oil through holes 28 and the slipping of the surface of the member 18 upon the surface of the member 25 will cause a weeping of the oil over the edges of the curved surface of the member 18 into the oil circulation system between the laminations of the springs, which, in the form shown in Fig. 2, consists of the holes 35, leading to the grooves 36, the flow of oil being controlled by the movement of the spring. It will be apparent that a large oil opening may be used, which cannot readily become clogged and the oil may be under pressure, but the flow will be restricted to a mere weepage and there will be no weepage unless there is movement of the spring. The flow of oil is therefore dependent upon the flexure of the spring. As soon as movement of the spring ceases or commences, the flow of oil respectively ceases and commences. The oil passes through the circulatory system, lubricates the surfaces of the laminations and passes eventually in the form shown in Fig. 2, through the opening 37 to the rubbing surfaces between the spring and the pin 33. A reservoir 46 is formed in the housing 34, which stores up lubricant to provide a continuous supply of these rubbing surfaces. An opening 38 in the housing 34 is provided for conducting oil to other bearings, so that the spring may be a mere link in a complete circulating system and a hole 39 in the rear axle housing 6 has a similar function.

Casings 41 extend from the openings in the ends of the bracket respectively to the openings of the housing 34 and the rear axle construction. These casings are secured by split rings 40. These casings may be of any preferably flexible material, which will restrain the lubricant from escape. A jacket 42, of well-known material, may surround the spring and extend from the center bracket or housing 23, to either end housing and assist in conducting the lubricant, thereby forming a part of the circulating system. Casings 41 may also inclose fibrous material 43 of any character, which will absorb and conduct oil, as a wick might; and which will, at the same time, pad out or upholster the casings.

In the form shown in Fig. 3, longitudinal movement of the spring relatively to the frame is restrained by the mounting at the center of the spring, and the bracket or housing 23 is modified by affixing the bearing member 25 to the housing, so that the housing or bracket has a fixed curved surface on the inside of the upper portion thereof, which engages the upper curved surface of the ring 18. The oil supply pipe 27 supplies lubricant, the flow of which is controlled by the relative movement of the members 18 and 23. The center portion of the spring being fixed in its longitudinal movement, such movement must be provided for at the end bearing and the housing 34 is therefore modified by having within it cylindrical bearing surfaces 34', in which there is positioned a cylindrical bearing member 45, in which there is a slot which accommodates the end of the spring. The circulating system within the laminations of the spring discharges into the reservoir 46 in the housing 34, and this reservoir provides a continuous supply of oil.

In the form where longitudinal movement of the spring is prevented by the middle bearing, the sides of the ring 18 may be extended out into the circular cheek plates 49, as shown in Fig. 10, and these cheek plates are positioned in recesses 50, formed in the back face of the bracket and in the inner face of the cover plate 29.

In the form shown in Figs. 4 and 5 the lubricating system for the laminations may be made by the concave surfaces 51 of the spring laminations, or by groove and tongue 52, this being a matter of choice and available materials. In this form the lubricant passes to the opening in through the center of the laminations in which the shear pin 20 is positioned. The hole 53, through ring 18, does not register with the lubricant supply pipe 27 and is therefore fed by weepage, as above described.

In the form shown in Fig. 6, mountings for the ends of the spring comprise the cylindrical bearing members 45, as above described, and the center mounting is varied. Secured to the side of the frame is a pillow block 55, which has a roughened front face, and held against this face by the bolt 56, is a supporting member 57, which has a hollow extension 58, in which the bolt 56 is secured. Bolt 56 passes through a slot in the frame, so that upward and downward adjustment is provided for. The center spring housing comprises a cap member 59 and the base member 60, which surrounds the extension 58. The cap and base are held together by the bolt 61. The plug 62 closes the open end of the extension 58 and the nut 63 holds the base of the housing thereon. The washer 64 prevents leakage of the lubricant. The cap 65 closes the open end of the base, through which the extension 58 extends. The oil pipe 27 supplies lubricant through the bolt 56, to the hollow part of the extension 58 and a comparatively large opening 27' in the lower face of this extension extends to the outer bearing face of this extension. The base member 60 coöperates with the bearing surface of the extension 58, and it is only upon movement of the spring that oil is permitted to weep from the opening 27' to the openings 27'', which discharge into the passages 65 in the springs, which lead to the circulating system within the spring. This weepage occurs only upon movement of the spring, because the load is taken by the face of the extension 58 in which the opening 27' is made. The holes 65 in the back portion of the spring are preferably made larger than those in front, so that the greater supply of oil will go to the rear axle.

The flow of oil into the housings for the spring ends may be limited to the weepage between laminations or between bearing surfaces and surfaces of the spring and this limits the flow of oil through openings 38 and 39. The brake operating shafts 70 are inclosed within portions of the frame, and are operated by the cables 71 and levers 72. The oil flowing from the end mountings of the springs through openings 38 and 39 is led to these shafts, so that it is seen that on the frame there is a lubricant supply and on the rear axle housing there are bearings, as well as those on the frame, and that the spring constitutes a section of the circulating system for the lubricant, and that it is incidentally lubricated as the lubricant circulates. Because of the continuous movement of the laminations of the spring relatively to one another, the lubricant fed between the laminations of the spring will exude from the sides and jacket 42 assists in conducting the lubricant from the housing of one spring mounting to the housing of the other. From the rear of the spring, in the form shown in Fig. 2, there is a direct outlet 37' from the circulating system to the axle housing and weepage lubricates the spring mounting and passes to the brake shaft 70 through opening 39.

If it should prove desirable to attach the spring to any part which is to be resiliently supported by means of a shackle, the construction shown in Figs. 8 and 9 may be used, which comprises the shackle 75 carrying a pin 76, a bolt passing through the opening 77, attaches the shackle to the part with which it is desired to associate the spring. The usual casing 41 is secured to and surrounds the opening in the end of the shackle.

It is to be clearly understood that the bolts 15 do not pass through the laminations of the spring. Lips 80 are provided at the edges of certain of the housings, to prevent the flow of oil into the casings 41. In the bottom of the housings or brackets 23, openings 85 are provided for the outlet of lubricant, which may be allowed to drip away or be conducted to another point or carried back to the main supply system. The housings for the ends of the spring, such as housings 34, are provided with open ends for the insertion of the pins 33, or bearing members 45, and caps 90 close these ends and hold these members in position.

While I have described and illustrated a cantaliver spring construction for the most part, for the purpose of disclosing my invention, it is apparent that my invention may be embodied in constructions comprising springs of other types and I do not intend that my invention shall be limited by the specific structure herein described and illustrated, but intend that it shall be limited by the hereunto appended claims.

I claim.

1. In a device of the class described, a laminated spring, a source of lubricant supply for the laminations thereof and means the operation of which is dependent upon the flexure of said spring for controlling said supply.

2. In a device of the class described, parts to be resiliently spaced, a laminated spring coöperating with and spacing said parts, and a lubricant circulating system, the laminations of said spring comprising the section of said system extending from one of said parts to another.

3. In a device of the class described, parts to be resiliently spaced, a laminated spring coöperating with and spacing said parts, a bearing on one of said parts, and a source of lubricant supply, the laminations of said spring being arranged to conduct lubricant to said bearing from said supply.

4. In a device of the class described, a spring, a bearing therefor having an opening for the passage of lubricant, means coöperating with said opening and dependent upon flexure of said spring to control the flow of lubricant through said opening.

5. In a device of the class described, a spring having a bearing member, a bearing member coöperating with said first mentioned bearing member, one of said bearing members having an opening therein for the passage of lubricant and leading to the bearing face thereof at a point where the face of the coöperating bearing member is substantially unbroken, whereby the flow of lubricant is controlled by the movement of said spring.

6. In a device of the class described, a spring having a bearing member, a bearing member coöperating therewith, a lubricant system and means dependent upon the relative movement of said bearing members to control the flow of lubricant in said system.

7. In a device of the class described, a laminated spring having a lubricant circulating system for the laminations thereof, a source of lubricant supply and means dependent upon the flexure of said spring for controlling the flow of lubricant to said system.

8. In a device of the class described, a laminated spring, a mounting therefor, a lubricant circulating system for rubbing faces of said spring and mounting and means dependent upon the movement of said spring for controlling the flow of lubricant thereto.

9. In a device of the class described, a laminated spring having a lubricant circulating system and a bearing member, and a bearing member having a bearing face comprising a substantially uninterrupted portion coöperating therewith and having a lubricant supply opening leading to the bearing face thereof at a point thereof coöperating with said portion of said first named bearing face, said parts being arranged to deliver the lubricant passing between said members to said system.

10. In a device of the class described, a laminated spring having a lubricant circulating system and a bearing member, a bearing member coöperating with said first-named bearing member, and a source of lubricant supply for said system, said parts being arranged to deliver lubricant through said system to said bearing members.

11. In a device of the class described, parts to be resiliently spaced, a laminated spring coöperating with and spacing said parts, rubbing surfaces on one of said parts, a source of lubricant supply on said other part and means for conducting lubricant from said source to said surfaces and including the laminations of said spring.

12. In a device of the class described, a laminated spring having a plurality of bearing members, bearing members coöperating therewith, and means for delivering lubricant to one of said bearings, said parts being arranged to deliver lubricant from one bearing to said laminations and from said laminations to another of said bearings.

13. In a device of the class described, a plurality of parts to be spaced, a spring coöperating with and spacing said parts, housings secured to said parts and having openings for said spring, spring engaging means within certain of said housings, and a casing extending from one opening to another, said housing and casings substantially entirely surrounding said spring.

14. In a device of the class described, a laminated spring, mounting devices for said spring and comprising spring bearing members and housings therearound, means for supplying lubricant to said spring at one of said housings and a jacket surrounding said spring and extending from one housing to another and acting to carry lubricant to one of said bearings.

15. In a device of the class described, a laminated spring, mounting devices for said spring and comprising housings having openings for said spring, means for supplying lubricant to said spring at one of said housings, a jacket substantially surrounding said spring and extending from one housing to another, and a casing extending from one of said openings to another and surrounding said spring.

16. In a device of the class described, a plurality of parts to be spaced, a laminated spring coöperating with and spacing said parts, means for attaching said spring to said parts, including housings having openings for said spring a casing extending from one opening to another, said housings and casing substantially entirely surrounding said spring, and fibrous material within said casing.

17. In a device of the class described, a spring, a mounting device for said spring and comprising a housing, a spring bearing in said housing, and a source of lubricant supply, said housing having a lubricant reservoir for said bearing, said spring having means to carry lubricant to said reservoir of said housing.

18. In a device of the class described, a spring, a mounting device for said spring and having a bearing surface, a bearing surface on said spring, a bearing member having two bearing faces, one of which coöperates with said first named surface and the other of which coöperates with the bearing surface of said spring.

19. In a device of the class described, a spring, a mounting device for said spring and having a bearing surface, a bearing surface on said spring, a bearing member having two bearing faces, one of which cooperates with said first named surface and the other of which coöperates with the bearing surface of said spring, one pair of coöperating surfaces being curved and the other pair of coöperating surfaces being substantially plane.

20. In a device of the class described, parts to be spaced, a spring coöperating with and spacing said parts and having a bearing member, a housing secured to one of said members and having an opening in its side for the introduction and removal of said spring and being provided with a bearing member coöperating with said first member, and means for retaining said spring against passing through said opening.

21. In a device of the class described, a spring having a lubricant circulating system, a source of supply for said system and means controlled by the movement of said spring for governing the flow of lubricant from said system.

22. In a vehicle, a lubricant circulating system, a supporting spring and means controlled by said spring for governing the flow of lubricant in said system.

23. In a vehicle, a frame, an axle housing, a laminated spring supporting said frame from said housing, said spring having a lubricant circulating system, means for conducting lubricant from said system substantially directly to said housing and means for conducting lubricant weeping from said spring to other parts of said vehicle.

24. In a vehicle, a lubricant circulating system having as one portion thereof a spring, a source of supply for said system, and means controlled by the flexure of said spring to control the flow of lubricant in said system.

25. In a vehicle, a lubricant circulating system having as an intermediate portion thereof a spring, a source of supply for said system, and means controlled by the flexure of said spring to control the flow of lubricant in said system.

26. In a device of the class described, a spring having a bearing member, a bearing member coöperating with said first mentioned bearing member, one of said bearing members having an opening therein for the passage of lubricant and leading to the bearing face thereof at a point where the face of the coöperating member is formed to control the flow of lubricant through said opening, whereby the flow of lubricant is controlled by the movement of said spring.

27. In a device of the class described, a spring, a member having an opening for the discharge of lubricant, a member normally coöperating with said opening to control the discharge of lubricant therefrom, and arranged to move in accordance with the flexure of said spring to cause the flow of lubricant from said opening.

28. In a device of the class described, a spring, a member having an opening for the discharge of lubricant, a member normally closing said opening to prevent discharge therefrom, and operated upon the flexure of said spring to move relatively to said opening to cause the flow of lubricant from said opening.

29. In a device of the class described, parts to be resiliently spaced, a spring for spacing said parts and having a bearing surface, a bearing for said spring on one of said parts whereby end thrust may be sustained, a bearing member on said last mentioned part upon which said surface makes sliding contact, and a mounting for said spring upon the other part.

30. In a device of the class described, a spring, a ring surrounding said spring and having top and bottom surfaces, one of said surfaces comprising a bearing surface curved in the direction of the length of said spring, and a mounting for said spring having a complementally curved bearing surface coöperating with said first named surface.

31. In combination, a spring having a lubricant circulating system, a member having a lubricant opening therein for supplying lubricant to said system, and a part connected to said spring to move relatively to said opening upon flexure of said spring to control the flow of lubricant to said circulating system.

32. In a vehicle, a spring and parts coöperating therewith whereby said spring is flexed in the ordinary operation of the vehicle, a lubricant circulating system, and means operated by the flexure of said spring for controlling the flow of lubricant in said system.

33. In a vehicle, a spring and parts coöperating therewith whereby said spring is flexed in the ordinary operation of the vehicle, a lubricant circulating system, a member having a lubricant opening therein for the flow of lubricant in said system, and a part actuated by flexure of said spring to move relatively to said opening to control the flow of lubricant in said circulating system.

34. In a vehicle, a spring and parts coöperating therewith whereby said spring is flexed in the ordinary operation of the vehicle, a lubricant circulating system, and means operated by the flexure of said spring, whereby the flow of lubricant in said system is proportioned to the flexing of said spring.

In testimony whereof, I have signed my name to this specification.

JOSEPH B. FERGUSON.